United States Patent [19]

Edwards et al.

[11] Patent Number: 5,108,847
[45] Date of Patent: Apr. 28, 1992

[54] RECHARGEABLE CELL TERMINAL CONFIGURATION AND CHARGING DEVICE

[75] Inventors: Kim B. Edwards, Alachua; Kenneth E. Toops; Clifford L. Scholefield, both of Gainesville, all of Fla.

[73] Assignee: Gates Energy Products, Inc., Gainesville, Fla.

[21] Appl. No.: 683,950

[22] Filed: Apr. 11, 1991

Related U.S. Application Data

[62] Division of Ser. No. 589,156, Sep. 27, 1990, Pat. No. 5,038,093.

[51] Int. Cl.⁵ .............................................. H01M 2/30
[52] U.S. Cl. ...................................... 429/7; 429/121; 429/178; 320/2
[58] Field of Search .................. 429/7.1, 93, 121, 122, 429/178; 320/2, 3

[56] References Cited

U.S. PATENT DOCUMENTS

| | | |
|---|---|---|
| 3,506,902 | 4/1970 | Sullivan . |
| 4,147,838 | 4/1979 | Leffingwell . |
| 4,213,079 | 7/1980 | Mullersman . |
| 4,229,686 | 10/1980 | Mullersman et al. . |
| 4,382,219 | 5/1983 | Heine et al. . |
| 4,489,268 | 12/1984 | Beachy . |
| 4,577,145 | 3/1986 | Mullersman . |
| 4,602,202 | 7/1986 | Mundschenk et al. . |
| 4,608,528 | 8/1986 | Stillwell . |
| 4,628,242 | 12/1986 | Scholefield . |
| 4,628,243 | 12/1986 | Hodgman et al. . |
| 4,645,996 | 2/1987 | Toops . |
| 4,751,452 | 6/1988 | Kilmer et al. . |
| 4,873,479 | 10/1989 | Iimura et al. . |

*Primary Examiner*—Anthony Skapars
*Attorney, Agent, or Firm*—C. H. Castleman, Jr.; John L. Isaac; H. W. Oberg, Jr.

[57] ABSTRACT

A charger for charging a rechargeable electrochemical cell including: a first conductive terminal having a central opening therein and a first contact end, the first conductive terminal connected to circuitry capable of providing charging current at a first charging rate; and a second conductive terminal positioned within the opening, the second conductive terminal having a second contact end portion extending outwardly from and electrically insulated from the first contact end, the second conductive terminal connected to circuitry capable of providing charging current at a second charging rate. The charger may have an insulator with an insulating contact end portion in place of the second conductive terminal having a second contact end portion. Also, a rechargeable electrochemical cell for use with a charger including: conductive flexible positive and negative plates; the cell having a top end with a perimeter and a bottom end electrically connected preferably to the negative plate; an annular charging contact seat integral to and protruding outwardly from the top end and located on the top end away from the perimeter; and the charging contact seat in electrical connection with the positive plate. Additionally, combinations of a rechargeable electrochemical cell and a charger therefor are included.

7 Claims, 6 Drawing Sheets

RECHARGEABLE CELL TERMINAL CONFIGURATION AND CHARGING DEVICE

This is a divisional of application Ser. No. 07/589,156, filed Sep. 27, 1990, now U.S. Pat. No. 5,038,093.

BACKGROUND OF THE INVENTION

In general, this invention relates to rechargeable electrochemical cell terminal configurations as well as chargers having charging terminals designed for use with such cells. More particularly, this invention relates to a charger that includes a first conductive terminal having a central opening therein and a first contact end, and either (a) an insulator positioned within the opening and radially surrounded by the first contact end, the insulator having an insulating contact end portion extending outwardly from the opening, or (b) a second conductive terminal positioned within the opening and radially surrounded by the first contact end, the second conductive terminal having a second contact end portion extending outwardly from and electrically insulated from the first contact end. This invention also relates to a rechargeable electrochemical cell that includes a positive and negative plate, a top end with a perimeter, and an annular charging contact seat integral to and protruding outwardly from the top end and located on the top end away from the perimeter. This invention furthermore relates to combinations of a rechargeable electrochemical cell and a charger therefor.

The batteries used in consumer products can be classified as primary or secondary. The term battery is generally used to describe a single unit comprised of one or more cells. A primary battery is used only once because the active chemicals transformed during the discharge reaction cannot be returned to their original pre-discharge state. Secondary batteries, sometimes called storage batteries or accumulators, can be used repeatedly because the chemical reaction is readily reversible by recharging the battery. Two commonly used primary batteries are the carbon-zinc dry cell and the alkaline cell. Examples of rechargeable, or secondary, batteries are the nickel-cadmium battery, the lead-acid battery, and the nickel-metal hydride battery. Rechargeable battery containers have various shapes and sizes. The nine-volt rechargeable batteries disclosed in U.S. Pat. Nos. 4,213,079 and 4,147,838 are rectangular in shape, whereas cylindrical batteries such as AAA, AA, C, and D batteries are contained in cans. Secondary batteries are oftentimes manufactured to the same size specifications as primary batteries so that the secondaries may be used in place of primary batteries in battery-powered consumer products. This can create a problem for manufacturers of charges. Since the charging of primary batteries can result in adverse effects and potentially hazardous conditions, it is desirable that chargers be designed so that a primary battery inadvertently inserted into place for recharging, cannot be provided charging current.

Furthermore, certain secondary (rechargeable) batteries may be built to have charging current limitations which are different from other identically-sized secondary batteries. In such cases, it would be desirable to configure rechargeable quick-charge batteries so that they may both fit properly into consumer battery-operated products and properly engage in high rate charging circuits which will not accept rechargeable batteries unable to withstand the high/faster rate charging. A charger capable of (1) supplying charging current at a high rate to batteries which can handle the high rate and (2) supplying current at a lower rate to other rechargeable batteries of a corresponding size (which have a slightly different configuration), is also desirable.

Known rechargeable battery terminals and chargers are each deficient in some way and thus unable to produce the desired results discussed above. For example, U.S. Pat. No. 4,382,219 discloses a battery handle adapted for connection to a charger, which must be used with a storage cell in order to prevent improper charging of a nonrechargeable battery. U.S. Pat. No. 4,645,996 discloses a terminal extension permanently added to one of the power terminal contacts of a rechargeable battery so that the battery, in place, can complete the charger "recharging" circuit. However, by permanently adding a terminal extension of the type disclosed, the battery will not fit into battery-operated consumer products designed to accept standard-size primary batteries. U.S. Pat. No. 4,628,242 discloses a removable charging adapter which must be placed on a rechargeable battery to provide a current conducting path between a charger and the rechargeable battery. U.S. Pat. Nos. 4,628,243, 3,506,902, and 4,577,145 disclose terminals located along the side wall of cylindrical rechargeable batteries. This configuration gives a rechargeable battery a charging terminal different from its conventional end discharge terminals.

SUMMARY OF THE INVENTION

It is a primary object of this invention to provide both a rechargeable cell terminal configuration for rechargeable cells that can be used with existing chargers and a charger having specially-designed first and second charging rate charger terminals (or a first charging rate terminal and an insulator) to operate with the cell terminal configuration. It is a further object of one embodiment of this invention to provide first and second charging rate charger terminals (or a first charging rate terminal and an insulator) configured so that existing/known electrochemical cells will either (1) if nonrechargeable, not be charged or (2) if rechargeable, be charged only at a second charging rate which is different from the first charging rate. It is also an object to provide circuitry for use with a charger capable of performing the above objects.

Advantages of providing a rechargeable cell terminal and charger terminals as described herein are as follows: (1) charging of nonrechargeable cells can be avoided or the charging rate kept at an acceptable level and (2) overcharging of cells being charged at a high (fast) charge rate can be avoided.

Briefly described, the invention includes a charger for charging a rechargeable electrochemical cell, comprising: means for charging made up of at least a first conductive terminal having a central opening therein and a first contact end; and an insulator positioned within the opening and radially surrounded by the first contact end, the insulator having an insulating contact end portion extending outwardly from the opening. Another characterization of the invention includes a charger comprising: means for charging at a first charging rate made up of at least a first conductive terminal having a central opening therein and a first contact end; means for charging at a second charging rate (which is different from the first charging rate) made up of at least a second conductive terminal positioned within the opening and radially surrounded by the first contact end; and the second conductive terminal having a second contact end portion extending outwardly from and electrically insulated from the first contact end. A further characterization includes a rechargeable electrochemical cell comprising: a positive plate and a negative plate; the cell having a top end with a perimeter and a bottom end electrically connected to the negative plate; an annular charging contact seat integral to and protruding outwardly from the top end and located on the top end away from the perimeter; and the charging contact seat in connection with the positive plate so that energy may be delivered to recharge the cells when the terminals of a charger are brought into electrical contact with both the charging contact seat and the bottom end. Additionally, combinations of a rechargeable electrochemical cell and a charger therefor are included.

BRIEF DESCRIPTION OF THE DRAWINGS

The invention in its preferred embodiments will be more particularly described by reference to the accompanying drawings, in which like numerals designate like parts.

DETAILED DESCRIPTION OF THE PREFERRED EMBODIMENTS

Figure 1:
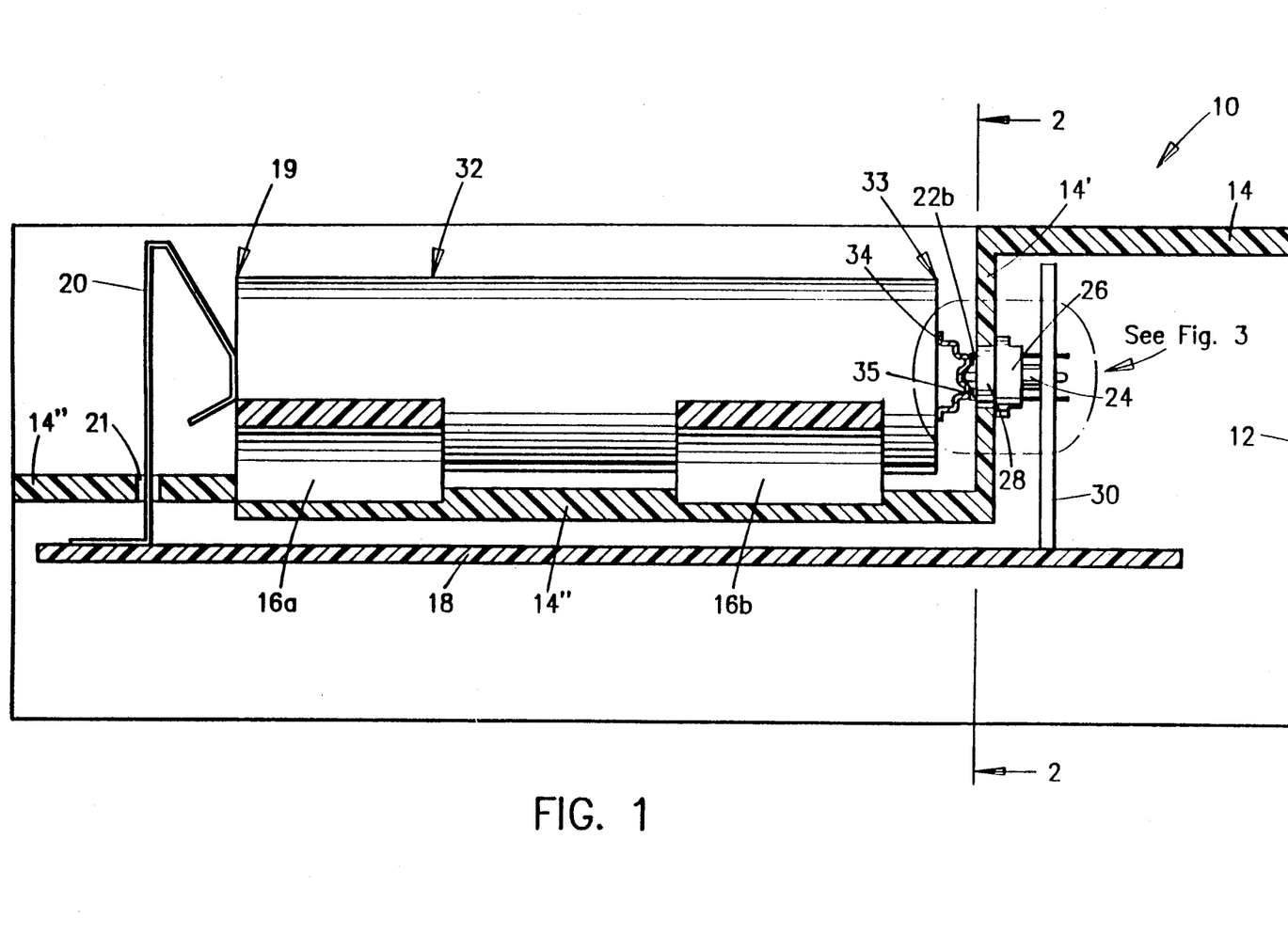
FIG. 1 is a sectional side view of a preferred rechargeable electrochemical cell engaged into a socket of a preferred charger of the invention, wherein a portion of one charger terminal has been left out and the outwardly protruding cell terminal of the invention has been cut away for easy viewing.

Shown at 10 of FIG. 1 is a preferred charger with a preferred rechargeable electrochemical (storage) cell 32 held into place by socket sidewall extensions 16a, 16b and conductive contact spring 20. The charger outer housing has been defined at 12 and is securely attached by suitable means (not shown) to horizontal cell support sections 14, 14" and lower supporting member 18. Socket sidewall extensions 16a, 16b are securely attached by suitable means (not shown) to horizontal section 14"; or in the alternative, extensions 16a, 16b can be molded together as one piece with horizontal sections 14, 14" and vertical support section 14'. Extensions 16a, 16b, sections 14, 14', 14", lower support member 18, and outer housing 12 can be made from suitable nonconductive materials such as thermoplastics or thermoset plastics, including polystyrene, ABS, or other material with sufficient strength and rigidity to support the cell(s) and charger components. Aperture 21 allows flat spring 20 (made from some conductive material such as spring steel) to extend upwardly through horizontal section 14" to meet with bottom end 19 of cell 32. Printed circuit board 30 holds the electronic components (not shown), connections/wiring (also not shown), and conductive charger terminal(s) 22b and 24 (which can also be an insulator) that make up the charger circuitry. Note that charger terminal 22a has been left out of the figure for easy viewing. 26 and 28 represent spacers made from suitable insulating material such as nylon or ABS. Terminals and spacers 22b, 24, 26, and 28 have not been sectioned in FIG. 1: each are shown in more detail in FIGS. 2 and 3. Permanently attached to, and centrally located on the top end 33 of cell 32 is an outwardly protruding annular charging contact seat 35 which is configured into a cell terminal shown sectioned at 34. Cell terminal 34, made from suitable conductive material such as a metal or metal alloy, is illustrated in more detail in FIG. 3.

Figure 2:
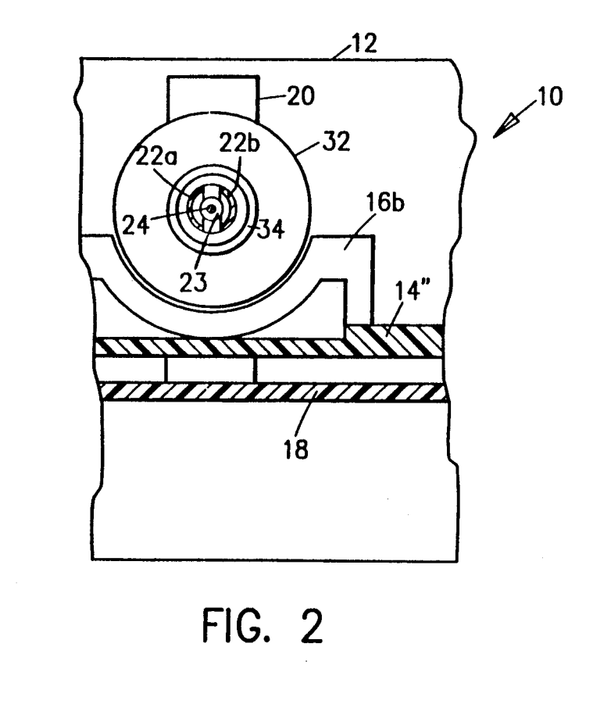
FIG. 2 is a partial sectional view taken along 2—2 of FIG. 1, wherein the one portion of the semi-circle shaped charger terminal absent from FIG. 1 is included.
Figure 10:
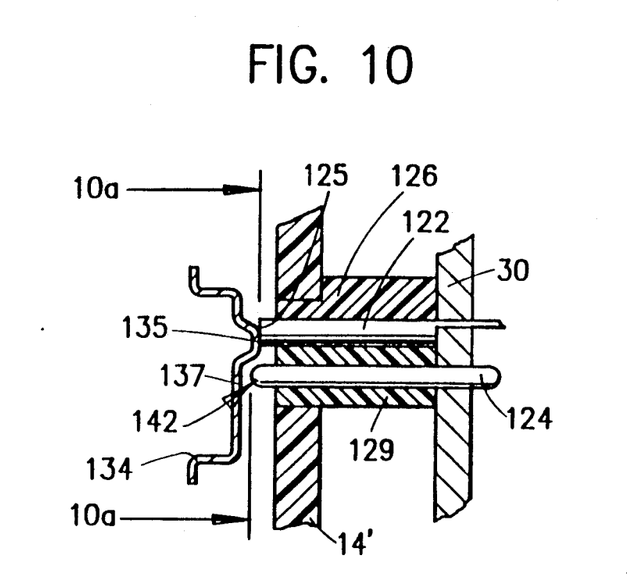
FIG. 10 is an enlarged, partial sectional view similar to FIG. 3, but which illustrates alternative charger and cell terminals of the invention.
Figure 11:
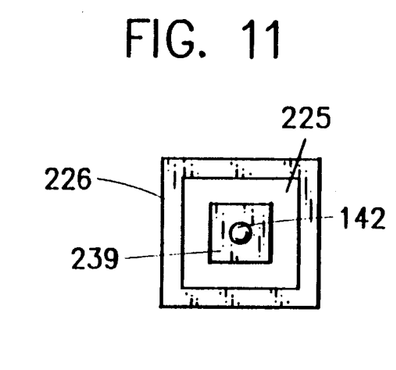
FIG. 11 is an end view similar to FIG. 10a, but which illustrates alternative first and second conductive charger terminals and insulating spacers.

FIG. 2 illustrates both halves 22a, 22b of a first conductive charger terminal radially surrounding a second conductive charger terminal, or alternatively an insulator 24 positioned within the opening 23 of the first conductive terminal. Although the first conductive terminal is shown as having two semi-circle shaped halves 22a, 22b it can take a multitude of other shapes such as: one single circular cylindrical piece (similar to that shown but made of one piece instead of two halves); one rectangular tube piece (or two separate halves) having a cross-section in the form of a rectangle or square (the contact end of which is shown in FIG. 11 at 225); or a single dowel-shaped piece 122 as shown in FIG. 10. FIGS. 10 and 11 will be described in more detail later. FIG. 2 illustrates from a front view, the configuration of socket sidewall extension 16b. When batteries having various shapes and sizes are used with the charger 10, socket sidewall extensions 16a, 16b must be sized and shaped accordingly so that (1) the positive and negative battery terminals properly engage with the conductive charger terminals, and (2) the batteries are properly seated within sidewall extensions 16a, 16b and flat spring 20.

Figure 3:
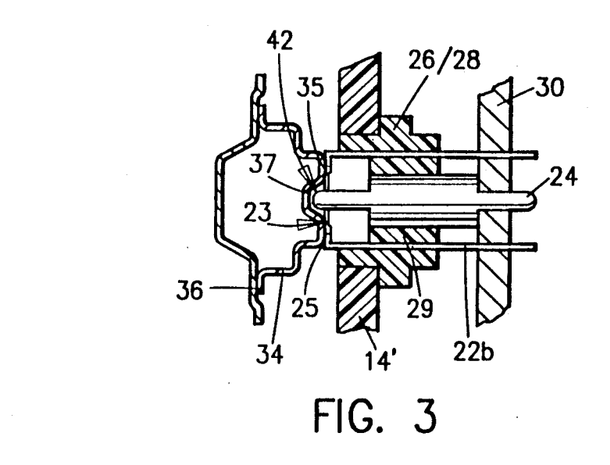
FIG. 3 is an enlarged, partial sectional view showing more detail of the interface between the charger terminal and the outwardly protruding cell terminal of FIG. 1.

The cell terminal 34 illustrated in FIG. 3 includes annular charging contact seat 35 and an indentation 37 for receiving (but not making electrical contact with) contact end portion 42.

Cell terminal 34 should be permanently attached to positive cover plate 36 by suitable means (not shown) such as spot welding. As can be seen by comparing FIGS. 3 and 4, spring 48, metal plate 52, elastomer plate 50, and aperture 51 (all found in known normally-sealed, nickel-cadmium rechargeable cells) are deleted from FIG. 3 for ease of viewing. As shown in better detail in FIG. 4, positive cover plate 36 can be surrounded by a plastic seal ring gasket 46 and then secured to a metal can 40 containing the rechargeable cell components (not shown). First conductive terminal half 22a is absent from FIG. 3 so that the two-terminal (or terminal-insulator) configuration can be more easily viewed. First conductive terminal half 22b is connected to circuitry (shown in FIGS. 7a, b, c and 8) capable of providing a charging current at a first rate and second conductive terminal 24 is connected to circuitry (also shown in FIGS. 7a, b, c and 8) capable of providing a charging current at a second, or different, rate. The first charging rate is preferably faster (or higher) than the second charging rate. First and second conductive charger terminals must be insulated from one another by means such as that shown as insulator 29. Insulators 26 and 28 of FIG. 1 have been combined for simplicity in FIG. 3, and can be used to secure the two-terminal (or terminal-insulator) mechanism into place on the vertical support section 14'. Charger terminals 22a, 22b and 24 are shown seated into place on printed circuit board 30. Second conductive terminal 24 can, in the alternative, be an insulator having an insulating contact end portion 42. Note that contact end portion 42 extends outwardly from a central opening 23 (also illustrated in FIG. 2 at 23) of first conductive terminal half 22b. As shown in FIG. 3, contact end portion 42 extends outwardly past first contact end 25 of first conductive terminal half 22b a distance less than the depth of indentation 37. Furthermore, charging contact seat 35 of cell terminal 34, protrudes a distance from the top end (shown at 33 of FIG. 1) which is greater than the length contact end portion 42 extends beyond the first contact end 25. FIG. 3 illustrates a few key features of the instant invention as described immediately above; and it will be appreciated that these key features may take many configurations.

Figure 4:
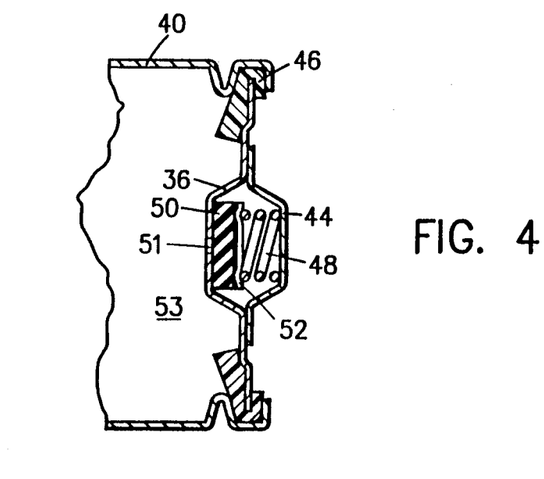
FIG. 4 is a partial sectional view of a known cylindrical normally-sealed, nickel-cadmium cell illustrating its cover plate and positive terminal configuration.
Figure 5:
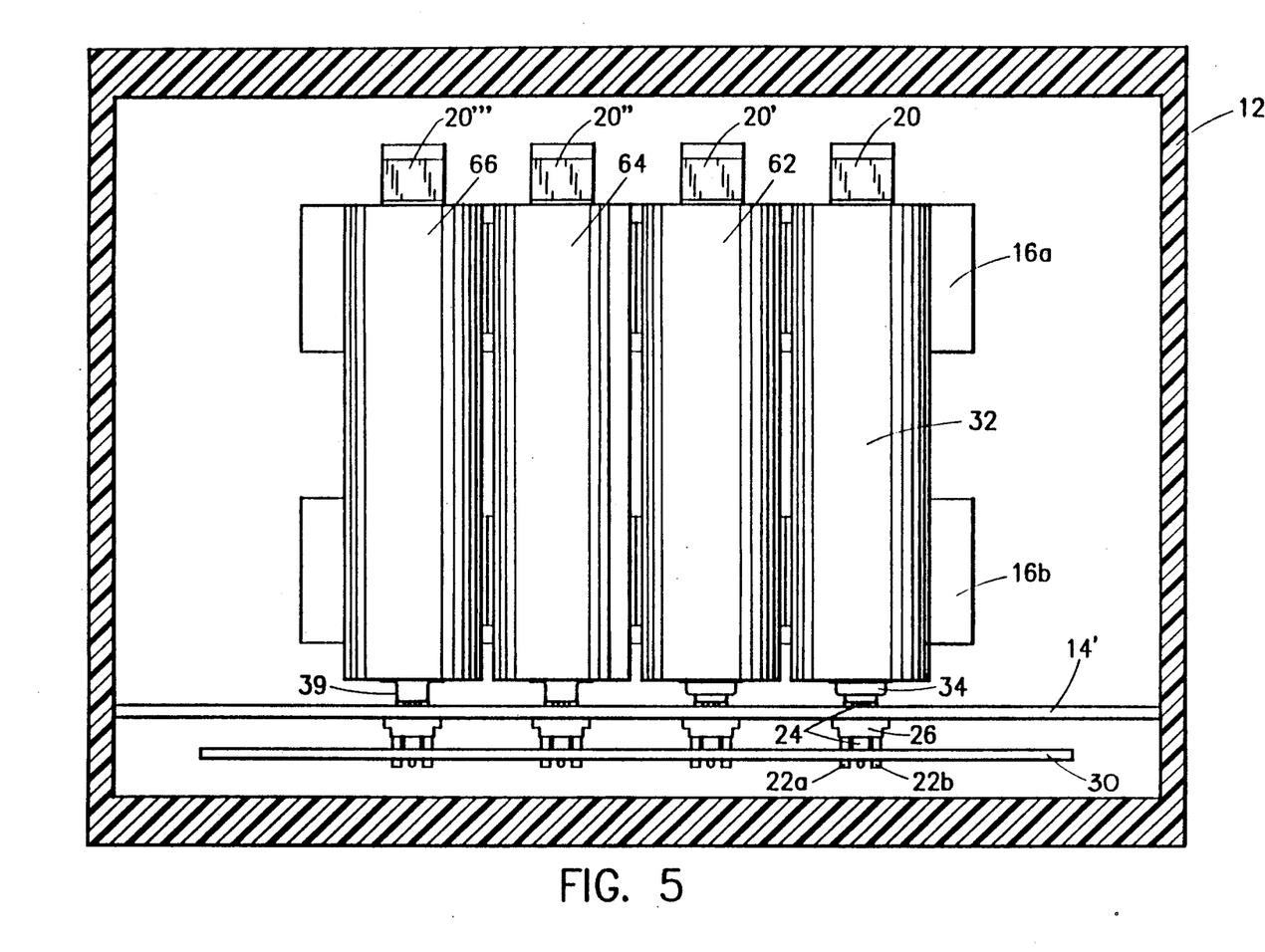
FIG. 5 is a top view of four preferred cells engaged in a preferred charger of the invention with its outer housing cut away for easy viewing.

Turning for a moment to FIG. 4 so that the positive terminal/cover 44 configuration of a known normally-sealed, nickel-cadmium cell can be compared to the cell terminal/cover 34 configuration of the invention embodiment illustrated in FIG. 3, one can appreciate that the positive terminal 44 of a known nickel-cadmium cell, if mated with the two-terminal (or terminal-insulator) 22a-22b, 24 charger configuration, will butt-up against contact end portion 42 of second conductive terminal (or insulator) 24. It appears from inspection of the known cell of FIG. 4 that a known cell placed into a socket of the battery charger of the instant invention, will never come into contact with first contact end 25 of first conductive terminal 22a, 22b. In a preferred embodiment of the invention, first conductive terminal 22a, 22b is electrically connected to circuitry capable of providing a fast charge rate current to a rechargeable cell having a terminal configured according to the instant invention, and second conductive terminal 24 is electrically connected to circuitry capable of providing a much lower rate charging current to a known (see FIG. 4, for example) rechargeable cell. And if element 24 is made of insulating material, known rechargeable cells (such as the cell illustrated in FIG. 4) as well as known nonrechargeable cells (having the FIG. 4 positive terminal 44 configuration or equivalent) inserted into a socket of the charger shown in FIGS. 1 or 5, will be unable to receive any charging current.

The inside 53 of metal can 40 illustrated in FIG. 4 will have the following four well-known cell components: (1) a negative electrode such as a cadmium negative plate; (2) a positive electrode such as a nickel positive plate; (3) electrolyte such as potassium hydroxide; and (4) a separator made of, for example, woven and nonwoven fabrics or porous plastic which holds the electrolyte in place and keeps the positive and negative electrodes from physically touching. Most often the positive and negative plates and the separator are wound into a spiral or jellyroll configuration before being inserted into the metal can 40 which serves as the negative terminal for the rechargeable cell. If such a cell has cell terminal 34 (FIG. 3) or positive terminal 44 (FIG. 4) electrically connected to the positive plate and the rechargeable cell's positive and negative terminals are brought into contact with corresponding conductive charger terminals, the rechargeable cell can be charged once electricity is provided to the circuit. Container 40 of a known normally-sealed, nickel-cadmium rechargeable cell is preferably made of nickel-plated steel. The safety vent mechanism illustrated in FIG. 4 which is made up of spring 48, metal plate 52, elastomer plate 50, and aperture 51 is added to prevent pressure buildup beyond a prescribed threshold pressure within a normally-sealed nickel-cadmium cell during abusive overcharge or overdischarge.

Note that although the rechargeable cells illustrated herein have circular cylindrical metal cans, the battery terminal configuration of the instant invention can be used with batteries of various shapes and sizes such as the typical 9-volt rechargeable battery disclosed in U.S. Pat. No. 4,147,838 issued to Leffingwell. Furthermore the cell terminal configuration of the instant invention may be adapted for use with other electrochemical rechargeable systems such as nickel-metal hydride, zinc-air, lithium, and lead-acid.

The top view of four cells engaged in a preferred charger of the invention (FIG. 5) illustrates how rechargeable cells 32, 62, 64, and 66 (cell 32 held into place by socket sidewall extensions 16a, 16b and metal flat spring 20) can be positioned within charger outer housing 12. Similarly, cells 62, 64, and 66 are held into place in their respective sockets by flat springs 20', 20'', 20'''. Note that an alternative configuration for cell terminal 34 is shown at 39. Although not shown in cutaway view, within alternative cell terminal 39 is an indentation similar to that shown at 37 in FIG. 3 for receiving contact end portion 42. The charger embodiment illustrated in FIG. 5 may be modified to accept and charge more than four rechargeable cells.

Figure 6:
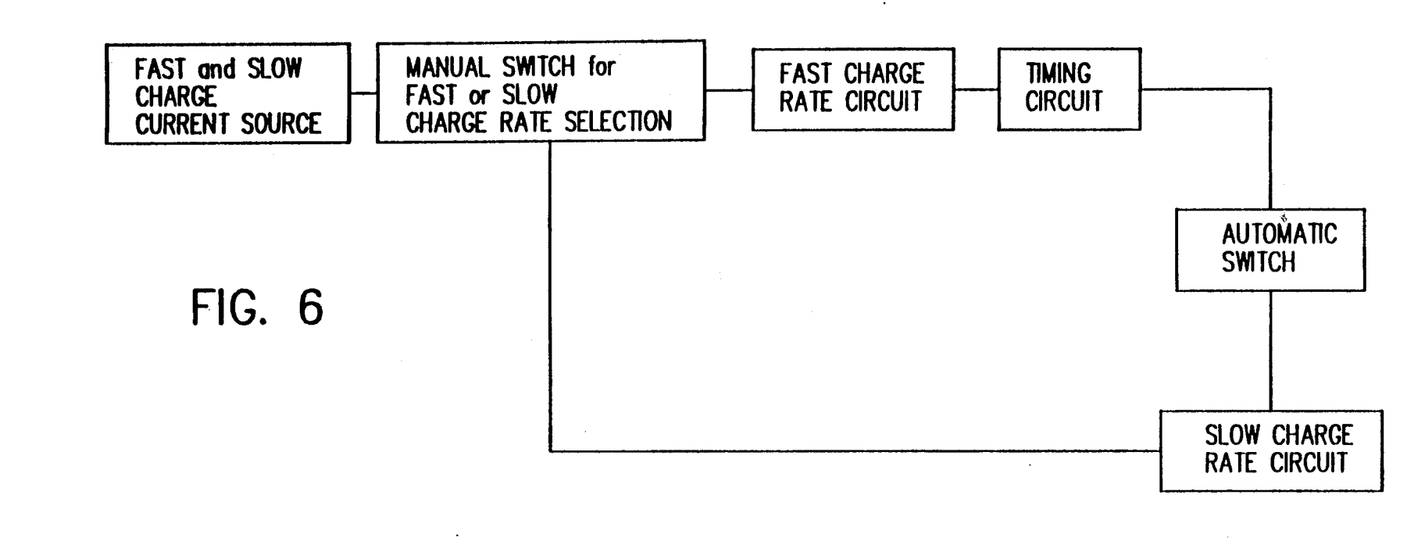
FIG. 6 is a block flow diagram of an embodiment of circuitry for a charger of the invention.

The block flow diagram of FIG. 6 simply sets forth the main elements of an embodiment of circuitry for a preferred charger of the invention. The components of each block will be further described below.

Figure 7A:
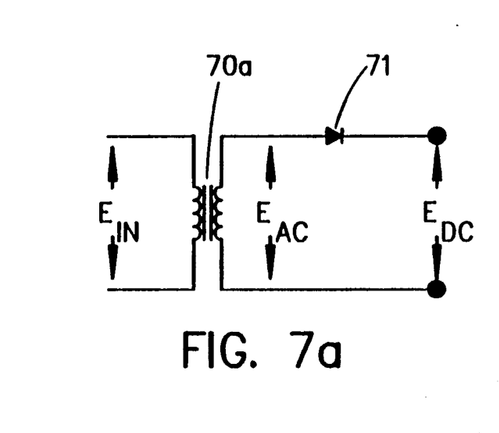
FIGS. 7a, 7b, and 7c illustrate alternative circuitry for accomplishing the element represented by the left-hand box labelled FAST AND SLOW CHARGE CURRENT SOURCE of FIG. 6.
Figure 7B:
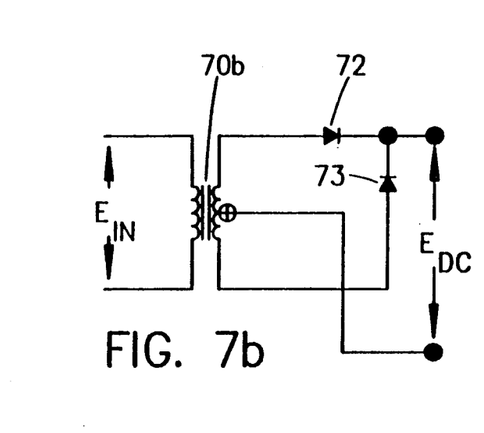
Figure 7C:
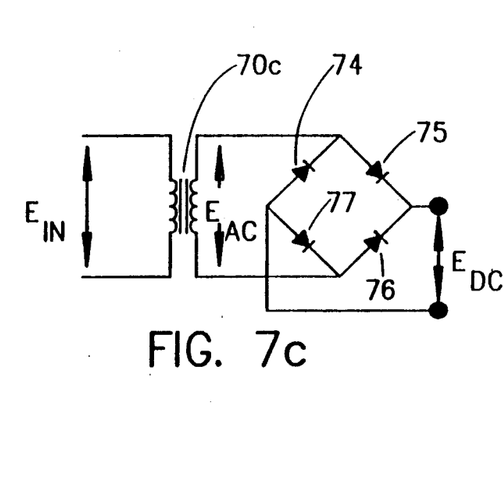

FIGS. 7a, 7b, and 7c illustrate three alternative ways to rectify alternating current (AC) into a direct current (DC) voltage, designated by $E_{DC}$ which is then available for use by the charger circuitry to provide charging current at a high (faster) rate and a low (slower) rate to charge electrochemical cells. Rechargeable cells may be charged from either a DC power source (such as another battery, a DC generator, or a photovoltaic cell array) or from a rectified AC power source. In FIGS.

7a, 7b, and 7c the AC power source voltage supplied is indicated by $E_{IN}$ (which can be, for example, the voltage available from a typical wall socket or 120 Volts AC). Transformers 70a, 70b, and 70c are often utilized to "match" the voltage $E_{IN}$ supplied by the AC power source to the charge voltage of the cell. Diodes 71, 72, 73, 74, 75, 76, and 77 are positioned in the circuits to produce the following well-known AC voltage rectifying circuits: FIG. 7a is a half-wave rectifier circuit, FIG. 7b is a full-wave center-tapped rectifier circuit, and FIG. 7c is full-wave bridge rectifier circuit.

Figure 8:
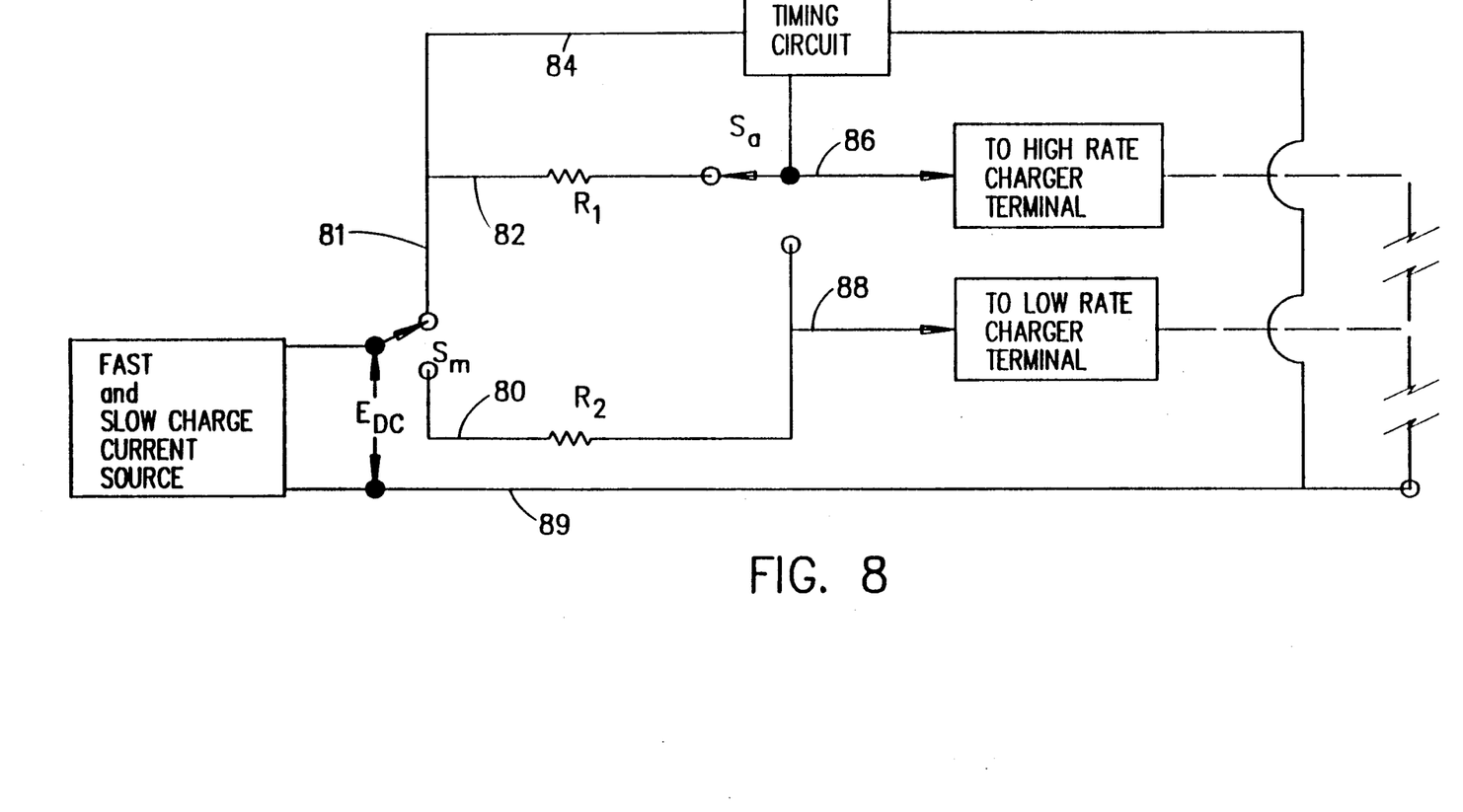
FIG. 8 is a combination block and circuit diagram illustrating, in more detail, the block flow diagram of FIG. 6.

The direct current voltage, $E_{DC}$, supplied to the circuit of FIG. 8 can be manually connected (by way of manual switch $S_m$) to either line 80 so that current will flow through resistor $R_2$, or to line 81 so that current will flow through both resistor $R_1$ and line 84 connected to the timing circuit. One can see that when current is applied to line 80 through resistor $R_2$, current will flow through line 88 (if automatic switch $S_a$ is positioned as shown) to the low rate charger terminal (which can be second conductive terminal 24 shown in FIG. 3). If one chooses to apply the DC voltage $E_{DC}$ through line 81 to resistor $R_1$ and the timing circuit, with automatic switch $S_a$ set as shown, current will flow through line 86 to the high rate charger terminal (which can be first conductive terminal 22a, 22b). The timing circuit has been positioned to operate with automatic switch $S_a$ as an overcharge prevention system. This system would work as follows: after a preset period of time during which the rechargeable cell is being provided current at the high rate, automatic switch $S_a$ can be flipped so that current flowing through the timing circuit flows through line 88 to the low rate charger terminal. For example, if the high rate charging current has a value of 725 mA so that an AA-size nickel-cadmium rechargeable cell of nominal capacity 650 Ah could be charged to full capacity in at least one hour, to avoid overcharging the cell, automatic switch $S_a$ would be flipped after one hour of charging at the high rate so that charging current could be provided at a lower rate of 75 mA. This low (or slower) rate charging current could have a value nearly equal to the typical charging current provided to known appliances such as portable hand-held vacuum cleaners, electric shavers, or other portable battery-operated devices. In this example, resistor $R_1$ would have a value of approximately 9 ohms, resistor $R_2$ would have a value of approximately 88 ohms, $E_{DC}$ would have a value of approximately 8 volts, and $E_{IN}$ would be that supplied from a typical wall socket or 120 volts AC. The overcharge prevention system illustrated as a timing circuit plus automatic switch $S_a$, may be accomplished by alternative means such as a temperature sensing overcharge switch device applied across the rechargeable cell or a peak detecting (negative delta voltage) charge termination circuit. Note that line 89 indicates ground.

The timing circuit, although not shown in detail, could be comprised of the following known dump-timed charge circuit employing binary or decade counters counting at line frequency, and arranged such that termination of high-rate charge (switch to low rate) occurs one hour after cell insertion.

If the lower rate charger terminal was not second conductive terminal 24, but instead an insulator 24, the automatic switching of $S_a$ to direct the current through line 88, would disconnect the rechargeable battery from the fast charge charging circuit. If one were to insert a known nickel-cadmium rechargeable cell such as that shown in FIG. 4 into the charger of the invention so that positive cell terminal 44 is in contact with second conductive terminal (or insulator) 24, manually switching $S_m$ to supply current through line 81 and thus resistor $R_1$ would prohibit charging current from reaching the known nickel-cadmium cell. But if one were to insert a rechargeable cell having a positive terminal configuration according to the instant invention into the charger of the invention, the cell made according to the instant invention would be capable of receiving charging current at either the high/fast or low/slow rates.

Figure 9:
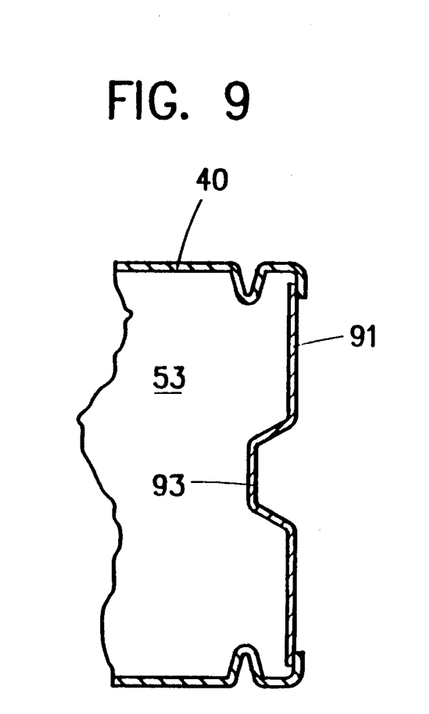
FIG. 9 is a partial sectional view of an alternative rechargeable electrochemical cell terminal configuration of the invention.

FIG. 9 shows an alternative cell terminal 91 configured differently from that illustrated in FIG. 3. Indentation 93 has been added for receiving contact end portion 42 (see FIG. 3). Metal can 40 is illustrated, but cover plate 36 (see FIGS. 3 and 4) which houses the safety vent mechanism for a typical normally-sealed, nickel-cadmium cell is absent from FIG. 9 for simplicity.

FIG. 10 illustrates alternative configurations for both first and second conductive charger terminals and the rechargeable cell terminal. The cell terminal 134 is permanently attached to, and centrally located on the top end 33 of, cell 32 (see FIG. 1). Cell terminal 134 has a charging contact seat 135 and an indentation 137 in lateral proximity thereto. First conductive charging terminal 122 is in the shape of a rod and has a first contact end 125. Second conductive charger terminal 124, also rod-shaped, has a second contact end portion 142 in lateral proximity to first contact end 125. Second contact end portion 142 extends outwardly past first contact end 125 a distance less than the depth of indentation 137. This depth is measured from charging contact seat 135 to the surface of the indentation shown at 137. As one can see in FIG. 10, indentation 137 does not allow second contact end portion 142 to come into contact with cell terminal 134. As was discussed earlier, second conductive terminal 124 may be replaced by a similarly-shaped insulator. Insulators 126, 129 have been provided to electrically insulate first and second conductive charger terminals 122, 124 from each other, and to secure the two-terminal (or terminal-insulator) mechanism into place on vertical support section 14'.

Figure 10A:
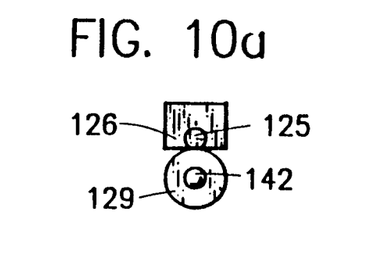
FIG. 10a is an end view taken along 10a—10a of FIG. 10 illustrating the first and second conductive charger terminals and respective insulating spacers of the FIG. 10 embodiment.

FIG. 10a illustrates a "head-on" view of first contact end 125, second contact end portion 142, and insulating spacers 126, 129.

FIG. 11, a view similar to that of FIG. 10a, illustrates second contact end portion 142 surrounded by insulating spacer 239. Alternative first contact end 225 of a first conductive charger terminal is shown disposed radially around and electrically insulated from second contact end portion 142 of a second conductive charger terminal. Insulating spacer 226 holds first conductive terminal 225 to vertical support section 14' (not shown in FIG. 11).

By way of example only, a charging device was constructed with the following outer housing dimensions: height of 37 mm (1.45 inches); width of 115 mm (4.53 inches); and length of 94 mm (3.7 inches). The outer diameter of the first conductive charger terminal (illustrated as halves 22a, 22b) connected to the high rate or fast charge charging current circuitry was 5.0 mm (0.2 inches). The second conductive charger terminal of this example has a second contact end portion approximately 1.0 mm in diameter. The second contact end portion extends outwardly from the first contact end of the first conductive terminal a length of 0.6 mm. The cell terminal 34 (FIG. 3) was welded to the cover plate for a normally-sealed, nickel-cadmium rechargeable cell.

While certain representative embodiments and details have been shown for the purpose of illustrating the invention, it will be apparent to those skilled in this art that various modifications may be made to the invention without departing from the spirit or scope of the invention. For instance, while the cell of the invention has been described with the container serving as the negative terminal and the top as the positive terminal, these terminals can be reversed. Similarly, the cell terminal configuration has been described as unitary with a single cell battery, but clearly the terminal could be associated with a multi-cell battery pack, and not be unitary with any particular cell of the pack. As used in the following claims the term "battery" means a single electrochemical cell, multiple electrochemical cells linked together with conductive connectors in desired series or parallel connection, or multiple interconnected electrochemical cells housed in a monobloc container.

What is claimed is:

1. A rechargeable battery for use with a charger, comprising:
    a conductive flexible positive plate and a conductive flexible negative plate;
    the battery having a top and bottom end, said top end having a perimeter and said bottom end electrically connected to said negative plate;
    an annular charging contact seat integral to and protruding outwardly from said top end, said charging contact seat located on said top end away from said perimeter; and
    said charging contact seat electrically connected to said positive plate so that energy may be delivered to recharge the battery when terminals of the charger are brought into electrical contact with both said charging contact seat and said bottom end.

2. The battery of claim 1 wherein the cell is a cylindrical normally sealed, nickel-cadmium cell and said annular charging contact seat is substantially centrally located on said top end.

3. The battery of claim 1 wherein the battery is a normally sealed, nickel-metal hydride cell.

4. A rechargeable battery having positive and negative terminals, adapted to mate with corresponding charging terminals forming a portion of circuitry for recharging the battery, the improvement comprising:
    one of said battery terminals adapted to mate with a two contact portion charging terminal, one of the charging contact portions protruding a greater distance from the charging terminal than the other charging contact portion, said other charging contact portion being conductive;
    said one battery terminal formed of a raised conductive contact seat and in lateral proximity thereto an indentation, arranged and adapted so that when the battery terminals are brought into operable relation to the charging terminals said raised contact seat of the one battery terminal makes conductive contact with the other charging contact portion of the charging terminal, and said one charging contact portion extends into said indentation.

5. The rechargeable battery of claim 4 wherein said battery is cylindrical, said one battery terminal is positioned at one end of the cylinder, and the raised contact seat is laterally offset from the longitudinal axis of the cylinder.

6. The rechargeable battery of claim 4 wherein the raised conductive contact seat is generally annular, and said indentation is in the form of a recess or hole positioned radially inwardly from said annular contact seat.

7. The rechargeable battery of claim 4 wherein said one protruding charging contact portion is an insulator.

* * * * *